United States Patent
Sivanandan et al.

(10) Patent No.: US 10,593,995 B2
(45) Date of Patent: Mar. 17, 2020

(54) POLAR POLYSILOXANE ELECTROLYTES FOR LITHIUM BATTERIES

(71) Applicant: Seeo, Inc., Hayward, CA (US)

(72) Inventors: Kulandaivelu Sivanandan, Fremont, CA (US); Hany Basam Eitouni, Oakland, CA (US)

(73) Assignee: SEEO, INC., Hayward, CA (US)

( * ) Notice: Subject to any disclaimer, the term of this patent is extended or adjusted under 35 U.S.C. 154(b) by 0 days.

(21) Appl. No.: 16/427,319

(22) Filed: May 30, 2019

(65) Prior Publication Data

US 2019/0288335 A1    Sep. 19, 2019

Related U.S. Application Data

(62) Division of application No. 15/469,481, filed on Mar. 24, 2017, now Pat. No. 10,361,457.

(51) Int. Cl.
| | |
|---|---|
| *H01M 10/0565* | (2010.01) |
| *C08G 77/42* | (2006.01) |
| *H01M 4/38* | (2006.01) |
| *H01M 4/40* | (2006.01) |
| *H01M 4/505* | (2010.01) |
| *H01M 4/525* | (2010.01) |
| *H01M 4/58* | (2010.01) |
| *H01M 4/587* | (2010.01) |
| *H01M 2/16* | (2006.01) |
| *H01M 4/62* | (2006.01) |
| *H01M 10/052* | (2010.01) |
| *H01M 4/02* | (2006.01) |

(52) U.S. Cl.
CPC ........ *H01M 10/0565* (2013.01); *C08G 77/42* (2013.01); *H01M 2/1653* (2013.01); *H01M 4/622* (2013.01); *H01M 10/052* (2013.01); *H01M 2004/028* (2013.01); *H01M 2300/0082* (2013.01); *H01M 2300/0094* (2013.01)

(58) Field of Classification Search
CPC ................................................ H01M 10/0565
See application file for complete search history.

(56) References Cited

U.S. PATENT DOCUMENTS

| 5,548,055 A | 8/1996 | Narang et al. |
| 5,606,077 A | 2/1997 | Lersch et al. |
| 6,589,383 B1 | 7/2003 | Takaoka et al. |
| (Continued) | | |

FOREIGN PATENT DOCUMENTS

WO    2014012679 A1    1/2014

OTHER PUBLICATIONS

(Zhou, GB et al.) "Solvent-free cation-conducting polysiloxane electrolytes with pendant oligo (oxyethylene) and sulfonate groups." Macromolecules. 1993. vol. 26. No. 9; abstract; p. 2206 cited in SE-090PCT ISR.

(Continued)

*Primary Examiner* — Stephan J Essex
(74) *Attorney, Agent, or Firm* — Brooks Kushman P.C.

(57) ABSTRACT

Synthesis and electrochemical properties of a new class of polymer electrolytes based on polar polysiloxane polymers is described. Unlike ethylene oxide-based polymers, these materials are oxidatively stable up to at least 4.2 V, the operating voltage of high energy cells that use cathode materials such as lithium nickel cobalt aluminum oxide (NCA) and lithium nickel cobalt manganese oxide (NCM). Use of these polymers electrolytes as an alternative to PEO in solid-state lithium batteries is described.

13 Claims, 3 Drawing Sheets

(56) References Cited

U.S. PATENT DOCUMENTS

| | | |
|---|---|---|
| 9,136,562 B2 | 9/2015 | Singh et al. |
| 2006/0083992 A1 | 4/2006 | Nakanishi et al. |
| 2007/0059607 A1 | 3/2007 | Nakanishi et al. |
| 2010/0239918 A1 | 9/2010 | Pratt et al. |
| 2011/0206994 A1 | 8/2011 | Balsara et al. |
| 2011/0281173 A1 | 11/2011 | Singh et al. |
| 2012/0029099 A1 | 2/2012 | Hsieh et al. |
| 2012/0153219 A1 | 6/2012 | Zhang et al. |
| 2013/0040207 A1 | 2/2013 | Gupta et al. |
| 2014/0322614 A1 | 10/2014 | Eitouni et al. |
| 2016/0028114 A1 | 1/2016 | Pratt et al. |

OTHER PUBLICATIONS

Abe, "Oligo- and polysilo xanes," Prog. Polym. Sci. xx (2004) xxx-xxx.

Dunki, "Fine-tuning of the dielectric properties of polysiloxanes by chemical modification," RSC Advances, 2015,5, 50054-50062.

International Search Report for PCT/US16/36265, received Aug. 30, 2016.

International Search Report for PCT/US2017/024186 (SE-093PCT).

Jaumann, "Hyperbranched Polyalkoxysiloxanes Synthesis, Characterization and Applications," Dissertation, Aachen University, Sep. 4, 2008.

Li, "Preparation of Nitrile Containing Siloxane Triblock Copolymers and their Application as Stabilizers for Siloxane Magnetic Fluids," Dissertation, Virginia Polytechnic Institute, Dec. 11, 1996.

Liang, "Plasticizing Li single-ion conductors with low-volatility siloxane copolymers and oligomers containing ethylene oxide and cyclic carbonates," J. Mater. Chem. A, 2015,3, 21269-21276.

Long, "Polymer electrolytes for lithium polymer batteries," J. Mater. Chem. A, 2016,4, 10038-10069.

Racles, "Chemical modification of polysiloxanes with polar pendant groups by co-hydrosilylation," RSC Advances 2014, 4, 37620-37628.

Substance Record for SID 240694679. Feb. 13, 2015. [retrieved on Feb. 13, 2015]. Retrieved from the Internet.

Xue, "Poly(ethylene oxide)-based electrolytes for lithium-ion batteries," J. Mater. Chem. A, 2015, 3, 19218.

Zhu, "Synthesis of Polysiloxanes Bearing Cyclic Carbonate Side Chains: Dielectric Properties and Ionic Conductivities of Lithium Triflate Complexes," Macromolecules 1994,27, 4016-4079.

Notification Concerning Transmittal of International Preliminary Report on Patentability for PCT Application No. PCT/US2017/024186, dated Oct. 3, 2019, 6 pages.

POLAR POLYSILOXANE ELECTROLYTES FOR LITHIUM BATTERIES

CROSS-REFERENCE TO RELATED APPLICATIONS

This application is a divisional application of U.S. patent application Ser. No. 15/469,481, filed Mar. 24, 2017, now U.S. Pat. No. 10,361,457 issued Jul. 23, 2019, which is incorporated by reference herein.

BACKGROUND OF THE INVENTION

Field of the Invention

This invention relates generally to electrolytes for lithium battery cells, and, more specifically, to electrolytes that are especially suited for use in high voltages cells.

More and more lithium battery manufacturers are using next-generation cathode materials such as NCA (lithium nickel cobalt aluminum oxide) and NCM (lithium nickel cobalt manganese oxide) in order to exploit their potentially high gravimetric energy densities (as high as 300-500 Wh/kg), their good rate capabilities and their long-term stability. Cells made with such oxidic materials often operate at higher voltages (e.g., as high as 4.5V) than do cells (e.g., 3.6-3.8V) with olivine cathode materials such as LFP (lithium iron phosphate). Electrolytes that have been stable at the lower voltages of LFP cells may have difficulty operating at the higher voltages. Polyethyleneoxide (PEO) based electrolytes that are commonly used in conventional solid-state lithium batteries are known to be stable only at the lower voltages (e.g., lower than 4.0V) and may have difficulty operating at these new higher voltages, especially in the cathode. Degradation, in the form of oxidation, may lead to capacity fade early in the life of a cell.

Thus, there is a need to develop polymer electrolytes that are non-PEO-based and are well-suited to operate in the high voltage (HV) conditions of next generation cathode materials.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1:
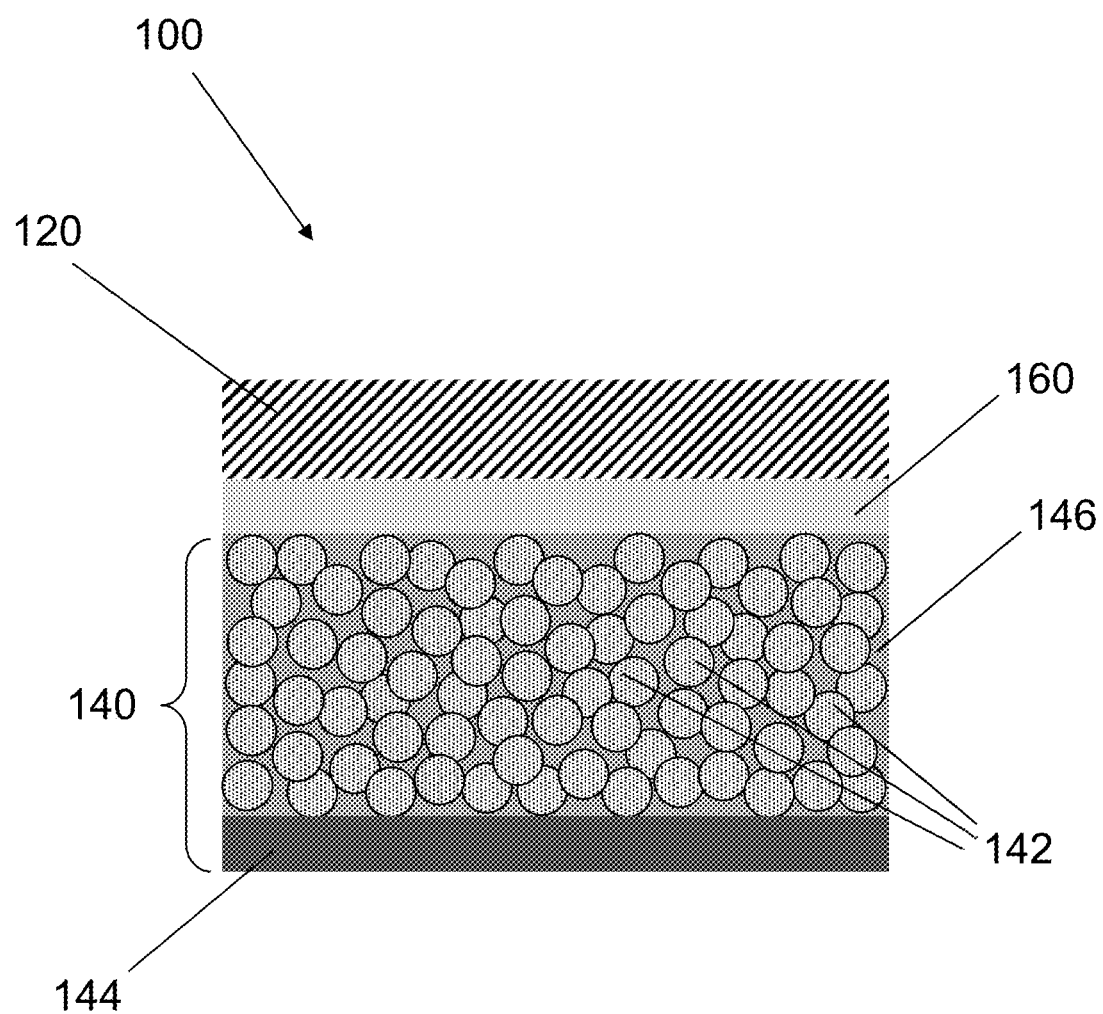
FIG. 1 is a schematic illustration of one configuration of a lithium battery cell that contains a catholyte, according to an embodiment of the invention.

In one embodiment of the invention, a polymer composition includes a homo polymer with the structure:

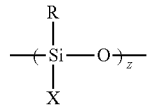

wherein each X is selected independently from the group consisting of sulfone, cyanomethyl ester, sulfoxide, pyrrolidone, cyclic carbamate, phosphonate, phosphate, carbonate and perfluoroalkyl groups; each R is selected independently from the group consisting of methyl, ethyl, n-propyl, iso-propyl, tert-butyl, n-butyl, n-hexyl, 2-ethylhexyl, cyclohexy, vinyl, allyl, propargyl, norbornene, cyclopentadienyl, nitroxide, bromo-isobutry bromide, 2,2,6,6-tetramethyl-1-piperidinyloxy, n-tertpbutyl-n-(2-methyl-1-phenylpropyl)-O-(1-phenylethyl)hudroxylamine), hydride, azido propyl, mercaptopropyl, benzophenone, aminopropyl, phenyl, benzyl, napthalene, anthracene styrene, acylate, norbornene, epoxide groups and substituted moieties of phenyl, benzyl, napthalene, anthracene groups, styrene, acylate, norbornene, and epoxide groups, in which the substituting species are methyl, ethyl, propyl, n-butyl or t-butyl groups; and z is an integer that ranges from 2 to 1000.

In another embodiment of the invention, a polymer composition includes a copolymer with the structure:

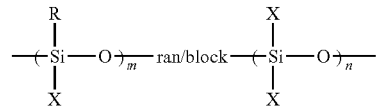

wherein each X is selected independently from the group consisting of cyano, sulfone, sulfoxide, cyanomethyl ester, pyrrolidone, cyclic carbamate, phosphonate, phosphate, carbonate and perfluoroalkyl groups; each R is selected independently from the group consisting of methyl, ethyl, n-propyl, isopropyl, tert-butyl, n-butyl, n-hexyl, 2-ethylhexyl, cyclohexy, vinyl, allyl, propargyl, norbornene, cyclopentadienyl, nitroxide, bromo-isobutry bromide, 2,2,6,6-tetramethyl-1-piperidinyloxy, n-tertpbutyl-n-(2-methyl-1-phenylpropyl)-O-(1-phenylethyl)hudroxylamine), hydride, azido propyl, mercaptopropyl, benzophenone, aminopropyl, phenyl, benzyl, napthalene, anthracene styrene, acylate, norbornene, epoxide groups and substituted moieties of phenyl, benzyl, napthalene, anthracene groups. styrene, acylate, norbornene, and epoxide groups, in which the substituting species are methyl, ethyl, propyl, n-butyl or t-butyl groups; and m and n are integers, and the sum of m and n ranges from 2 to 1000.

An electrolyte salt may be added to either the polymer or the copolymer shown above to make them useful as electrolyte materials. Examples of useful salts are listed below. In one arrangement, the electrolyte salt is a lithium salt.

In another embodiment of the invention, a block copolymer composition includes an ordered nanostructure that includes a matrix of first domains formed by an association of first polymers and second domains formed by an association of second polymers. The first polymers and the second polymers form first copolymers. The first copolymers are block copolymers in which the first polymers form first blocks and the second polymers form second blocks. The first blocks include one or more of a homopolymer and a copolymer with the following structure

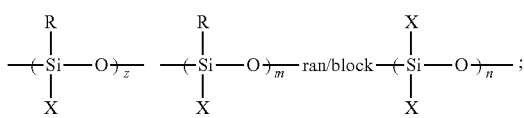

wherein each X is selected independently from the group consisting of cyano, sulfone, cyanomethyl ester, sulfoxide, pyrrolidone, cyclic carbamate, phosphonate, phosphate, carbonate and perfluoroalkyl groups; each R is selected independently from the group consisting of methyl, ethyl, n-propyl, isopropyl, tert-butyl, n-butyl, n-hexyl, 2-ethylhexyl, cyclohexy, vinyl, allyl, propargyl, norbornene, cyclopentadienyl, nitroxide, bromo-isobutry bromide, 2,2,6,6-tetramethyl-1-piperidinyloxy, n-tertpbutyl-n-(2-methyl-1-phenylpropyl)-O-(1-phenylethyl)hudroxylamine), hydride, azido propyl, mercaptopropyl, benzophenone, aminopropyl, phenyl, benzyl, napthalene, anthracene styrene, acylate, norbornene, epoxide groups and substituted moieties of phenyl, benzyl, napthalene, anthracene groups. styrene, acylate, norbornene, and epoxide groups, in which the substituting species are methyl, ethyl, propyl, n-butyl or t-butyl groups; z is an integer that ranges from 2 to 1000; and m and n are integers, and the sum of m and n ranges from 2 to 1000.

The second blocks may include one or more polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, polyvinylidene fluoride, and copolymers that contain styrene, methacrylate, or vinylpyridine.

In another embodiment of the invention, an electrolyte material includes an electrolyte salt and a homo polymer with the structure:

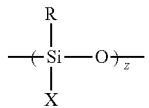

wherein each X is selected independently from the group consisting of cyano, sulfone, cyanomethyl ester, sulfoxide, pyrrolidone, cyclic carbamate, phosphonate, phosphate, carbonate and perfluoroalkyl groups; each R is selected independently from the group consisting of methyl, ethyl, n-propyl, isopropyl, tert-butyl, n-butyl, n-hexyl, 2-ethylhexyl, cyclohexy, vinyl, allyl, propargyl, norbornene, cyclopentadienyl, nitroxide, bromo-isobutry bromide, 2,2,6,6-tetramethyl-1-piperidinyloxy, n-tertpbutyl-n-(2-methyl-1-phenylpropyl)-O-(1-phenylethyl)hudroxylamine), hydride, azido propyl, mercaptopropyl, benzophenone, aminopropyl, phenyl, benzyl, napthalene, anthracene styrene, acylate, norbornene, epoxide groups and substituted moieties of phenyl, benzyl, napthalene, anthracene groups. styrene, acylate, norbornene, and epoxide groups, in which the substituting species are methyl, ethyl, propyl, n-butyl or t-butyl groups; and z is an integer that ranges from 2 to 1000.

In another embodiment of the invention, an electrolyte, includes an ordered nanostructure comprising a matrix of first domains formed by an association of first polymers and second domains formed by an association of second polymers. The first polymers and the second polymers form first copolymers that may be block copolymers in which the first polymers form first blocks and the second polymers form second blocks. The first blocks may include polymer selected from the group consisting of:

a homopolymer with the structure:

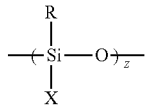

and a copolymer with the structure:

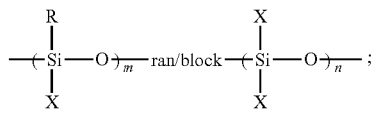

wherein each X is selected independently from the group consisting of cyano, sulfone, cyanomethyl ester, sulfoxide, pyrrolidone, cyclic carbamate, phosphonate, phosphate, carbonate and perfluoroalkyl groups; each R is selected independently from the group consisting of methyl, ethyl, n-propyl, isopropyl, tert-butyl, n-butyl, n-hexyl, 2-ethylhexyl, cyclohexy, vinyl, allyl, propargyl, norbornene, cyclopentadienyl, nitroxide, bromo-isobutry bromide, 2,2,6,6-tetramethyl-1-piperidinyloxy, n-tertpbutyl-n-(2-methyl-1-phenylpropyl)-O-(1-phenylethyl)hudroxylamine), hydride, azido propyl, mercaptopropyl, benzophenone, aminopropyl, phenyl, benzyl, napthalene, anthracene styrene, acylate, norbornene, epoxide groups and substituted moieties of phenyl, benzyl, napthalene, anthracene groups. styrene, acylate, norbornene, and epoxide groups, in which the substituting species are methyl, ethyl, propyl, n-butyl or t-butyl groups; z is an integer that ranges from 2 to 1000; and m and n are integers, and the sum of m and n ranges from 2 to 1000.

The second blocks may include one or more polymers selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, polyvinylidene fluoride, and copolymers that contain styrene, methacrylate, or vinylpyridine.

In one arrangement, the block copolymer composition has first blocks that comprise the copolymer and each X is selected independently from the group consisting of cyano, sulfone, sulfoxide, cyanomethyl ester, pyrrolidone, cyclic carbamate, phosphonate, phosphate, carbonate and perfluoroalkyl groups.

In one arrangement, the first blocks also include an electrolyte salt, and the block copolymer composition is an electrolyte. Each X is selected independently from the group consisting of cyano, sulfone, sulfoxide, cyanomethyl ester, pyrrolidone, cyclic carbamate, phosphonate, phosphate, carbonate and perfluoroalkyl groups. The electrolyte salt may be a lithium salt.

In another embodiment of the invention, an electrochemical cell has an anode configured to absorb and release lithium ions; a cathode comprising cathode active material particles, an electronically-conductive additive, a catholyte, and an optional binder material; a current collector adjacent to an outside surface of the cathode; and a separator region between the anode and the cathode, the separator region comprising a separator electrolyte configured to facilitate movement of lithium ions back and forth between the anode and the cathode. At least one of the separator electrolyte and the catholyte includes any of the electrolytes described herein. In one arrangement, the separator electrolyte and the catholyte are the same.

In some arrangements, the electrochemical cell also has an overlayer between the cathode and the separator region, the overlayer comprising an overlayer electrolyte. The overlayer electrolyte may include any of the electrolytes described herein. In one arrangement, the overlayer electrolyte and the catholyte are the same.

The anode may include lithium metal, lithium alloy, graphite and/or silicon. The cathode active material particles may include one or more of lithium iron phosphate, nickel cobalt aluminum oxide, nickel cobalt manganese oxide, lithium manganese phosphate, lithium cobalt phosphate, lithium nickel phosphate, and lithium manganese spinel. The binder material may include polyvinylidene difluoride, poly (vinylidene fluoride-co-hexafluoropropylene, polyacrylonitrile, polyacrylic acid, polyethylene oxide, carboxymethyl cellulose, styrene-butadiene rubber, or combinations thereof.

DETAILED DESCRIPTION

The preferred embodiments are illustrated in the context of organosilicon polymers that can be combined with salts (e.g., lithium or other alkali metal salts) to create ionically conductive materials for use in lithium battery cells and the like. The skilled artisan will readily appreciate, however, that the materials and methods disclosed herein will have application in a number of other contexts where high-voltage electrolytes are desirable, particularly where long-term stability is important.

These and other objects and advantages of the present invention will become more fully apparent from the following description taken in conjunction with the accompanying drawings.

All publications referred to herein are incorporated by reference in their entirety for all purposes as if fully set forth herein. All ranges described herein are meant to include all ranges subsumed therein.

In this disclosure, the terms "negative electrode" and "anode" are both used to describe a negative electrode. Likewise, the terms "positive electrode" and "cathode" are both used to describe a positive electrode.

It is to be understood that the terms "lithium metal" or "lithium foil," as used herein with respect to negative electrodes, describe both pure lithium metal and lithium-rich metal alloys as are known in the art. Examples of lithium rich metal alloys suitable for use as anodes include Li—Al, Li—Si, Li—Sn, Li—Hg, Li—Zn, Li—Pb, Li—C or any other Li-metal alloy suitable for use in lithium metal batteries. Other negative electrode materials that can be used in the embodiments of the invention include materials in which lithium can intercalate, such as graphite, and other materials that can absorb and release lithium ions, such as silicon, germanium, tin, and alloys thereof. Many embodiments described herein are directed to batteries with solid polymer electrolytes, which serve the functions of both electrolyte and separator. As it is well known in the art, batteries with liquid electrolytes use an inactive separator material that is distinct from the liquid electrolyte. Such batteries are also included in the embodiments of the invention.

It is known that functionalities such as ethers and esters are not stable above 4 V, and functionalities such as carbonates and nitriles are stable above 4.2 V. Therefore, for use in high voltage cells, it may be useful for a non-PEO-based polymer electrolyte to contain only HV-stable functionalities such as carbonates and nitriles. However, such stable functional groups are very polar (or have high dipole moment) and, when incorporated into polymers, may cause polymer chain stiffening, which can result in increased glass transition temperatures (Tg) and decreases ionic conductivity.

Flexible, low Tg polymers such as polysiloxane, polyethylene, polybutadiene, and polycarbosilane are ideal platforms for incorporating HV-stable functional groups such as carbonates and nitriles because the flexibility of such polymers may balance any rigidity caused by interaction among such functional groups. Among these low Tg polymers, polysiloxane is the best candidate in terms of the ability for synthetic modification, high thermal stability and high oxidative stability (stable above 4.2 V).

In various embodiment of the invention, electrochemical properties for a number of low-glass-transition-temperature (low Tg) polysiloxane polymers with polar substituents are described. Such polar polysiloxane (PPS) polymers are oxidatively stable above 4.2 V, making them ideal for use as electrolytes and/or catholytes in next-generation high energy lithium battery cells that use cathode materials such as lithium nickel cobalt aluminum oxide (NCA) and lithium nickel cobalt manganese oxide (NCM).

Homopolymer and Copolymer Polar Polysiloxanes:

In one embodiment of the invention, the use of polar polysiloxane homopolymer (PPSH) materials as high voltage (HV) stable electrolytes for lithium battery cells is disclosed. In another embodiment, novel polymeric materials based on polar polysiloxane copolymer (PPSC) materials can also be used as HV stable electrolytes. Generalized structures for PPSH and PPSC are shown below. Note that the PPSC may be either a random copolymer or a block copolymer.

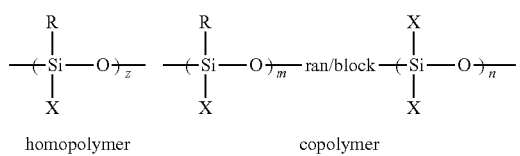

homopolymer          copolymer

In the homopolymer, z is an integer that ranges from 2 to 1000, m and n are integers, and the sum of m and n ranges from 2 to 1000. X is a polar group. Examples for X include but are not limited to cyano, sulfone, sulfoxide, cyanomethyl ester, pyrrolidone, cyclic carbamate, phosphonate, phosphate, carbonate and perfluoroalkyl groups (structures shown below). In some embodiments of the invention, each X in the homopolymer is chosen independently from the groups shown below, and each X in the copolymer is chosen independently from the groups shown below.

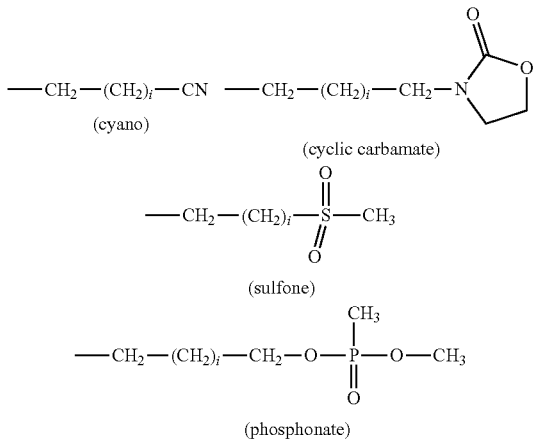

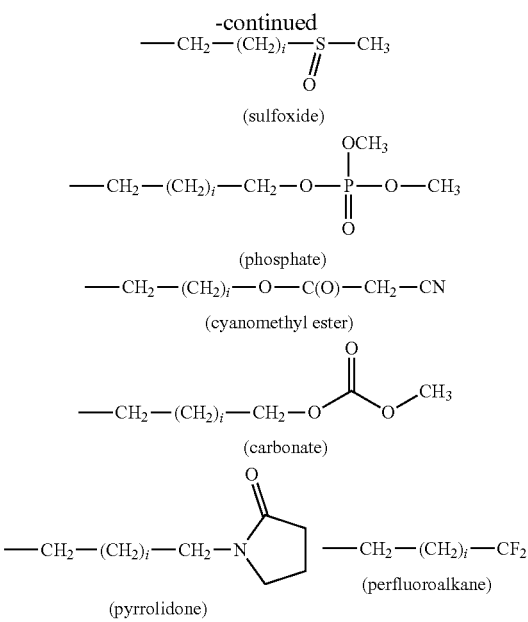

in which i is the graft length and is an integer with a range of 1 to 8.

Properties such as solubility, polarity, mechanical strength and conductivity in PPSH and PPSC can be modulated by changing the graft length, i. Larger values for i correspond to lower concentrations of polar groups X in the polymer. Similarly, smaller values for i, correspond to higher concentrations of polar groups X in the polymer. The concentration of polar groups X determines the dipole moment, the dielectric constant, the ability to dissolve salts, the ionic conductivity and the mechanical strength of the polymer. Higher concentrations of X increase dipole moment, the dielectric constant, and the ability to dissolve salts. Conductivity and mechanical properties may have maxima at intermediate values of X concentration.

Polymer properties such as polarity, ionic conductivity and mechanical strength in PPSH and PPSC can also be adjusted by careful choice of X group. For example, sulfone groups have higher dipole moments than do sulfoxide groups, so polymers that contain sulfone groups have stronger polarity than do polymers that contain sulfoxide groups. It is also true that, polymers that contain sulfone groups have a higher Tg and greater mechanical strength than do polymers that contain sulfoxide groups.

There are many possible groups for R. Each R in the homopolymer and in the copolymer may be chosen independently from the groups shown below. In various embodiments of the invention, R may be any of the following:

a saturated hydrocarbon. Examples include but are not limited to methyl, ethyl, n-propyl, isopropyl, tert-butyl, n-butyl, n-hexyl, 2-ethylhexyl, and cyclohexyl groups.

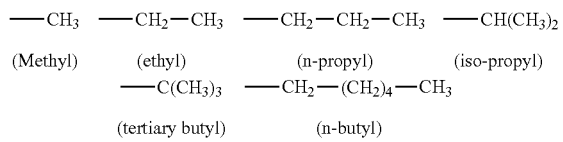

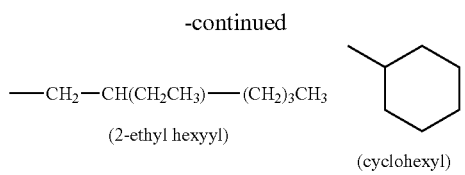

an unsaturated hydrocarbon. Examples include but are not limited to vinyl, allyl, propargyl, norbornene, and cyclopentadienyl groups.

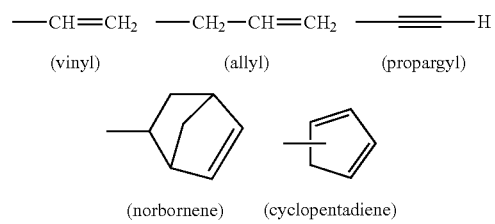

an aromatic hydrocarbon. Examples include but are not limited to substituted and unsubstituted moieties of phenyl, benzyl, napthalene, and anthracene groups.

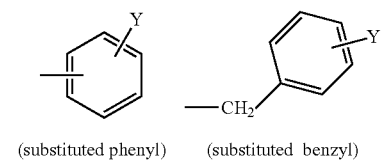

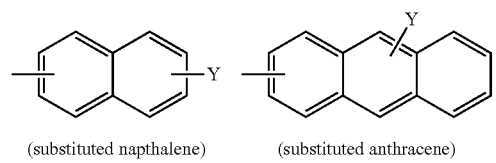

in which Y may be a methyl, ethyl, propyl, n-butyl or t-butyl group.

a polymerizable group. Examples include but are not limited to styrene, acylate, norbornene, and epoxide groups.

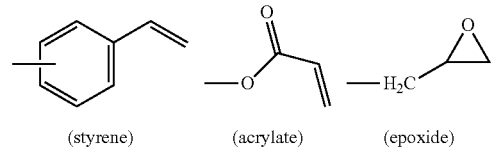

a polymerization initiator. Examples include but are not limited to nitroxide initiators such as 2,2,6,6-tetramethyl-1-piperidinyloxy and n-tertpbutyl-n-(2-methyl-1-phenylpropyl)-O-(1-phenylethyl)hudroxylamine) and atom transfer radical polymerization initiators such as bromo-isobutry bromide groups.

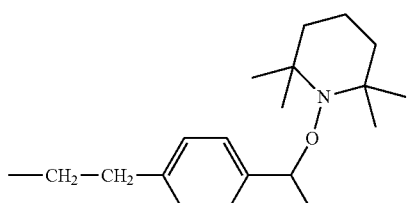

(2,2,6,6-Tetramethyl-1-poperidinyloxy)

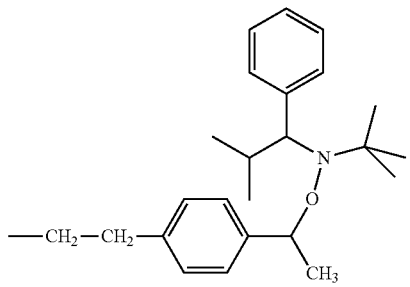

(N-tert-Butyl-N-(2-methyl-1-phenylpropyl)-O-
(1-pheylethyl)hydroxylamine)

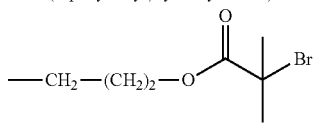

(bromo-isobutryl bromide)

a cross-linkable group. Examples include but are not limited to hydride, vinyl, azidopropyl, aminopropyl, mercaptopropyl, and benzophenone groups.

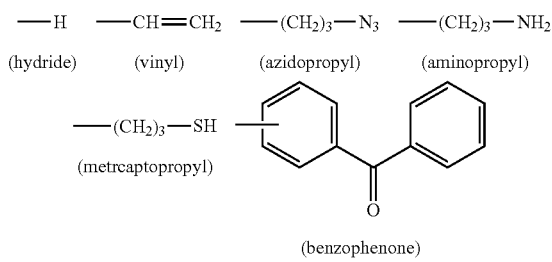

In one embodiment of the invention, R may be any of methyl, ethyl, n-propyl, isopropyl, tert-butyl, n-butyl, n-hexyl, 2-ethylhexyl, cyclohexy, vinyl, allyl, propargyl, norbornene, cyclopentadienyl, bromo-isobutry bromide, 2,2,6,6-tetramethyl-1-piperidinyloxy, n-tertpbutyl-n-(2-methyl-1-phenylpropyl)-O-(1-phenylethyl)hudroxylamine), hydride, azido propyl, mercaptopropyl, benzophenone, aminopropyl, phenyl, benzyl, napthalene, anthracene styrene, acylate, norbornene, or epoxide groups or substituted moieties of phenyl, benzyl, napthalene, anthracene groups. styrene, acylate, norbornene, or epoxide groups, in which the substituting species are methyl, ethyl, propyl, n-butyl or t-butyl groups.

Properties such as solubility, ionic conductivity and lithium transport number can be tuned through careful choice of R groups. Polymers that contain bulky R groups that are hydrophobic have increased hydrophobicity and decreased polarity, which may reduce their ability to dissolve lithium salts, resulting in lower ionic conductivity. For example, cyclohexyl groups are larger and more hydrophobic than are methyl groups, so polymers that contain cyclohexyl groups have weaker polarity than do polymers that contain methyl groups. Such weaker polarity lowers the ability to dissolve lithium salts, which decreases the ionic conductivity of the polymer.

Any of the PPSH and PPSC polymers disclosed herein may be used as an electrolyte when combined with an appropriate electrolyte salt.

Polar Polysiloxane Structures

In one embodiment of the invention, a polar polysiloxane (random or block) copolymer PPSC has two different X groups, $X_1$ and $X_2$, as shown in the structure below.

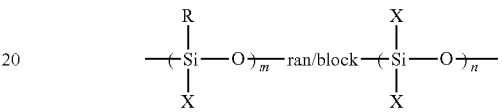

The sum of m and n is an integer that ranges from 2 to 1000. $X_1$ and $X_2$ are not the same, and each is chosen independently from the examples for X listed above. Each R is chosen independently from the examples for R listed above.

In another embodiment of the invention, a polar polysiloxane (random or block) copolymer PPSC is a terpolymer (polymer with three different repeat units) with two different R groups, $R_1$ and $R_2$, and only one X group as show in the structure below.

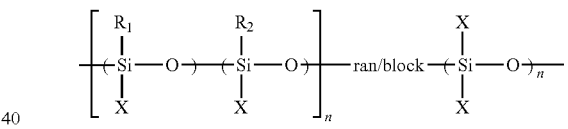

The sum of m and n ranges from 2 to 1000, and m and n are integers. $R_1$ and $R_2$ are not the same, and each is chosen from the examples for R listed above. Each X is chosen independently from the examples for X listed above.

In another embodiment of the invention, a polar polysiloxane (random or block) copolymer PPSC is a terpolymer with two different R groups, $R_1$ and $R_2$, and two different X groups, $X_1$ and $X_2$, as shown in the structure below.

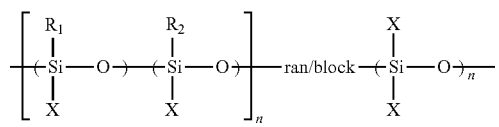

The sum of m and n ranges from 2 to 1000, and m and n are integers. $R_1$ and $R_2$ are not the same, and each is chosen from the examples for R listed above. $X_1$ and $X_2$ are not the same, and each is chosen from the examples for X listed above.

In one embodiment of the invention, a copolymer can be formed from two distinct polar polysiloxane homopolymers and has two different R groups, $R_1$ and $R_2$, and only one X group as shown in the structure below.

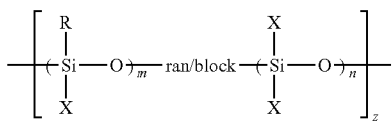

The sum of m and n ranges from 2 to 1000, and m and n are integers. $R_1$ and $R_2$ are not the same, and each is chosen from the examples for R listed above. Each X is chosen independently from the examples for X listed above.

In one embodiment of the invention, a PPSH has two different X groups, $X_1$ and $X_2$, and only one R group as shown in the structure below.

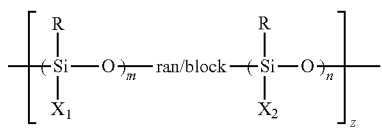

The sum of m and n ranges from 2 to 1000, and m and n are integers. $X_1$ and $X_2$ are not the same, and each is chosen from the examples for X listed above. Each R is chosen independently from the examples for R listed above.

In one embodiment of the invention, PPSH can either be a block or a random copolymer with two or more X and R groups.

In one embodiment of the invention, PPSC and PPSH are end-capped on both terminal chain ends with R groups that are identical to the pendant R groups used elsewhere in the structures as shown below.

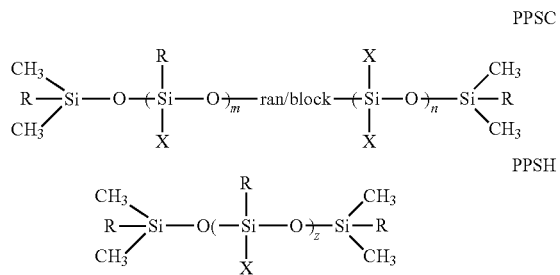

The sum of m and n ranges from 2 to 1000, m and n are integers, and z ranges from 2 to 1000. The R groups are all the same and are chosen from the examples for R listed above. The X groups may or may not be the same, and each X is chosen independently from the examples for X listed above.

In one embodiment of the invention, PPSC and PPSH are end-capped on both terminal chain ends with $R_1$ groups that are different from the pendant R groups, as shown below.

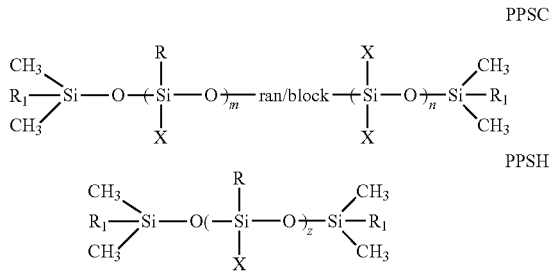

The sum of m and n ranges from 2 to 1000, m and n are integers, and z ranges from 2 to 1000. R and $R_1$ are not the same and each is chosen from the examples for R listed above. The R groups themselves may or may not be the same. The X groups may or may not be the same, and each X is chosen independently from the examples for X listed above.

In one embodiment of the invention, PPSC and PPSH are capped on each end with two different R groups, $R_1$ and $R_2$, as shown below.

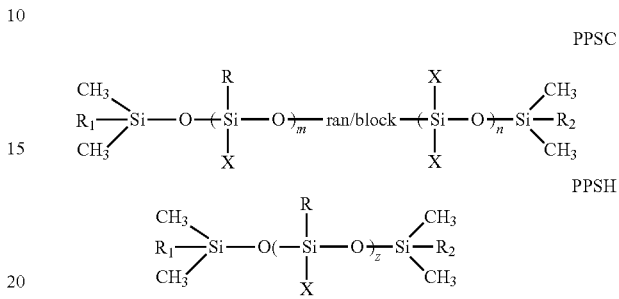

The sum of m and n ranges from 2 to 1000, m and n are integers, and z ranges from 2 to 1000. R, $R_1$, and $R_2$ are not the same and each is chosen from the examples for R listed above. The X groups may or may not be the same, and each X is chosen independently from the examples for X listed above.

In one embodiment of the invention, PPSH and PPSC have any of the structures shown below, in which the pendant R groups are methyl (—CH3) groups and X is a cyanopropyl group (—CH2CH2CH2-CN). The PPSC may a random or a block copolymer. When an electrolyte salt is added, such PPSH and PPSC polymer materials may be used as electrolytes. The sum of m and n ranges from 2 to 1000, m and n are integers, and z ranges from 2 to 1000.

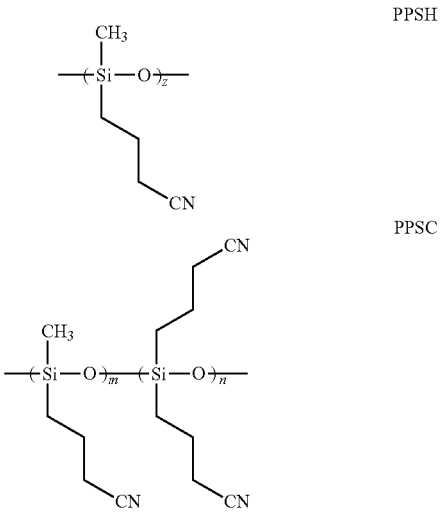

In one arrangement, triblock copolymers based-on PPSC and PPSH have end-capping on both chain ends with initiator groups such as bromoisobutryl bromide as shown in the structures below. Such initiator groups can be used to grow mechanically robust polymers such as polymethylacrylates (PMA), polybutylacrylates (PBA), polymethylmethacrylates (PMMA), polystyrene (PS), polyvinylpyridine (PVP), polytert-butylstyrene (PtBS) from the end groups of PPSC and PPSH, resulting in tri- or multi-block copolymers. The sum of m and n ranges from 2 to 1000, m and n are integers, and z ranges from 2 to 1000.

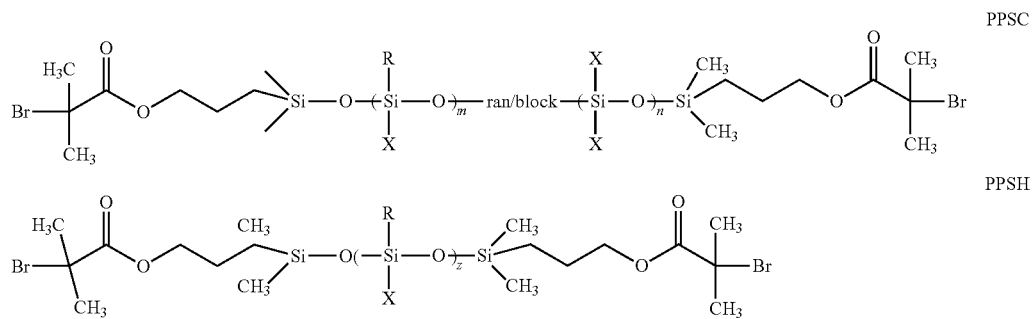

PPSC

PPSH

In one arrangement, diblock copolymers based-on PPSC and PPSH have end-cappings on only one of the chain ends with an initiator group such as bromoisobutryl bromide as shown below. Such initiator groups can be used to grow mechanically robust polymers such as polymethylacrylates (PMA), polybutylacrylates (PBA), polymethylmethacrylates (PMMA), polystyrene (PS), polyvinylpyridine (PVP), polytert-butylstyrene (PtBS) from PPSC and PPSH. The sum of m and n ranges from 2 to 1000, m and n are integers, and z ranges from 2 to 1000.

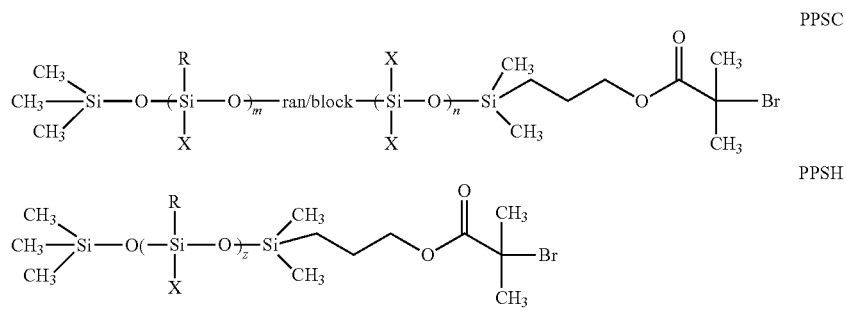

PPSC

PPSH

In one arrangement, brush or comb type copolymers based-on PPSC and PPSH can be synthesized using two or more pendant initiator groups such as bromoisobutryl bromide as shown below. Such initiator groups can be used to grow mechanically robust polymers such as polymethylacrylates (PMA), polybutylacrylates (PBA), polymethylmethacrylates (PMMA), polystyrene (PS), polyvinylpyridine (PVP), polytert-butylstyrene (PtBS) from PPSC and PPSH. In one arrangement, brush type polymers can be obtained by having two or more initiating groups as pendants in PPSC and PPSH molecules. The sum of m and n ranges from 2 to 1000, m and n are integers, and z ranges from 2 to 1000.

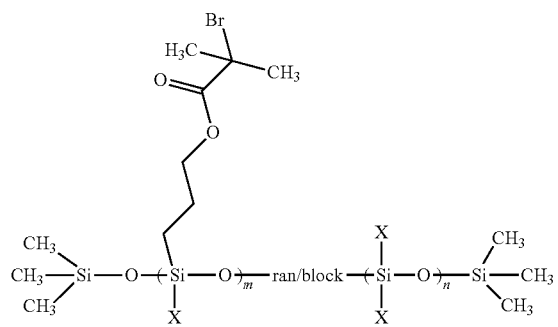

PPSC

-continued

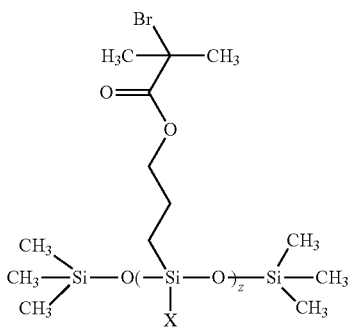

PPSH

PPSH and PPSCs can also form random copolymers, alternating copolymers, block copolymers or graft copolymers (when R is an atom transfer radical polymerization initiator) with non-siloxane based polymers such polybutadiene (PBD), polyethylene (PE), polyphenyleneoxide (PPE), and/or polyimide (PI), ion-conducting polymers such as polyethyleneoxide (PEO), polyphosphonate (PPN), polycarbonate (PC), polydimethylsiloxame (PDMS) and polyacrylonitrile (PAN).

In one arrangement PPSC and PPSH polymers form a cross-linkable network when R (the pendant or end cap) is a crosslinkable group such as benzophenone as shown below. The benzophenone group can be activated by UV light to generate a ketyl radial that can undergo recombination to facilitate crosslinking of polymer chains. The X groups may or may not be the same, and each is chosen independently from examples shown above. The sum of m and n ranges from 2 to 1000, m and n are integers, and z ranges from 2 to 1000.

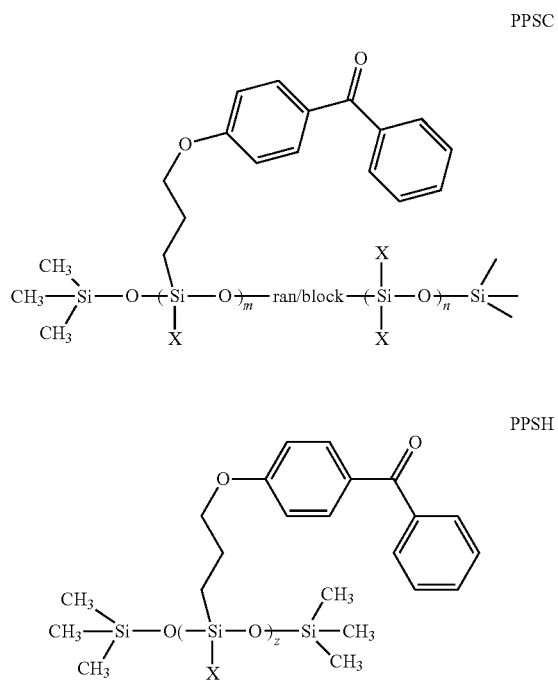

In another arrangement PPSC and PPSH polymers form a cross-linkable network when the chain-ends are capped with a cross-linkable group such as benzophenone as shown below. R and X are each chosen independently from examples shown above. The sum of m and n ranges from 2 to 1000, m and n are integers, and z ranges from 2 to 1000.

In one arrangement, one or more PPSH or PPCS polymers form block copolymers with second polymers, and together they form an ordered nanostructure. The second polymers are not PPH or PPCS polymers. The ordered nanostructure may contain a matrix of first domains made up of PPCS or PPSH polymer blocks and second domains made up of second polymer blocks. The PPCS/PPSH blocks may also include an electrolyte salt.

Conductivity of PPSH:

Impedance spectroscopy was used to measure conductivities of PPSH in which the pendant and end-capped R groups were methyl groups, X was a cyanopropyl group and z ranges from 10 to 500. The PPSH was mixed with various concentrations of LiTFSI and placed as the electrolyte in aluminum symmetric cells. The measurements were made at 80° C. The data in Table I shows that PPSH has sufficient lithium ion conductivity (on the order of $10^{-4}$ S/cm between 10 to 30 wt. % LiTFSI) at 80° C. to be useful in lithium battery cells.

TABLE I

Conductivities of PPSH at 80° C.

| Structure | LiTFSI (wt %) | Conductivity (S/cm) |
|---|---|---|
| (structure shown) | 10 | $1.2 \times 10^{-4}$ |
| | 20 | $1.3 \times 10^{-4}$ |
| | 30 | $1.4 \times 10^{-4}$ |
| | 40 | $8.6 \times 10^{-5}$ |
| | 50 | $5.8 \times 10^{-5}$ |

Conductivity of PPSC:

Impedance spectroscopy was used to measure conductivities of PSSC in which the pendant R groups were methyl groups, X was a cyanopropyl group, and the m:n ratio was 7:3. The PSSC was mixed with various concentrations of LiTFSI and placed as the electrolyte in aluminum symmetric cells. The measurements were made at 80° C. The data in Table II shows that PSSC has sufficient lithium ion conductivity (on the order of $10^{-4}$ S/cm between 10 to 30 wt. % LiTFSI) at 80° C. to be useful in lithium battery cells.

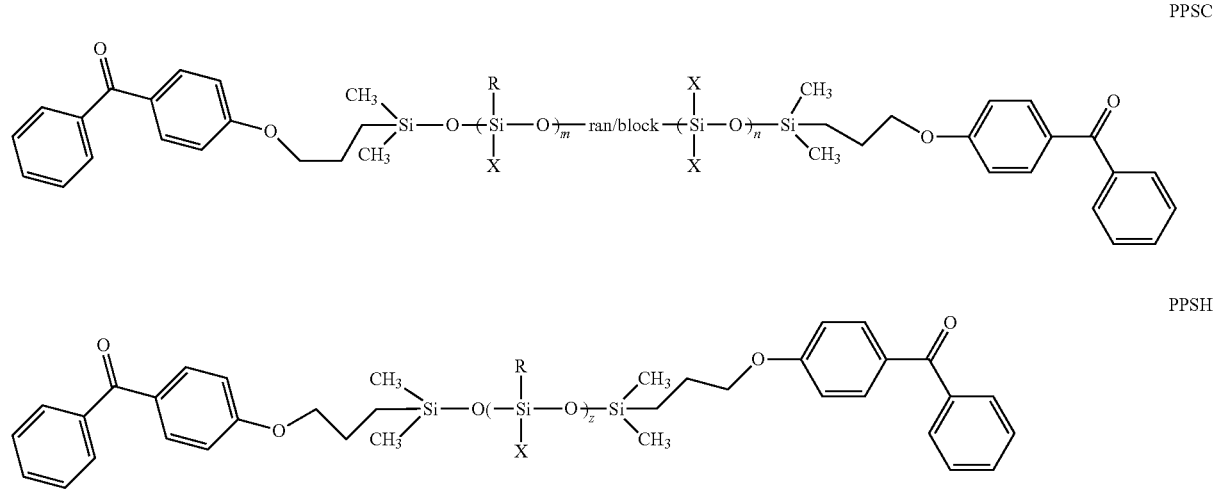

TABLE II

Conductivities of PPSC at 80° C.

| Structure | LiTFSI (wt %) | Conductivity (S/cm) |
|---|---|---|
| (polysiloxane structure with CH₃, CN substituents) | 10 | $1.1 \times 10^{-4}$ |
| | 20 | $1.5 \times 10^{-4}$ |
| | 30 | $1.4 \times 10^{-4}$ |
| | 40 | $7.8 \times 10^{-5}$ |

Voltage Stability of PPSH and PPSC Electrolyte Materials:

Cyclic voltammetry was used to test the voltage stabilities of the PPSH and PPSC electrolyte materials whose conductivities are shown in Table I and II. The setup consisted of an aluminum working electrode, a lithium reference electrode, and a lithium counter electrode. Solutions of PPSH in propylene carbonate (10 wt %) with $LiBF_4$ (10 wt % with respect to PPSH) and solutions of PPSC in propylene carbonate (10 wt %) with $LiBF_4$ (10 wt % with respect to PPSC) were made. The solutions were subjected to voltage sweeps from 1.38 V (open circuit voltage) to 5 V at room temperature, and the current responses were monitored. The onset of surging current at a particular voltage is considered to be the voltage at which PPSH or PPSC undergoes oxidation. Both PPSH and PPSC electrolyte materials were found to be stable at least up to 4.2V, the standard lithium battery cell operating voltage.

Polar Polysiloxane Electrolytes

PPS polymer materials may be used as electrolytes when they are combined with appropriate electrolyte salts. There are no particular restrictions on the electrolyte salt that can be used in such PPS electrolytes. Any electrolyte salt that includes the ion identified as the most desirable charge carrier for the application can be used. It is especially useful to use electrolyte salts that have a large dissociation constant within the polymer electrolyte. When an electrolyte is used in the cathode, it can be referred to as a catholyte.

Examples of appropriate salts for any electrolyte disclosed herein include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of alkali metals such as lithium, sodium, potassium and cesium, or silver, barium, lead, calcium, ruthenium, tantalum, rhodium, iridium, cobalt, nickel, molybdenum, tungsten or vanadium. Examples of specific lithium salts include LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, $LiN(SO_2CF_3)_2$, $LiN(SO_2CF_2CF_3)_2$, lithium alkyl fluorophosphates (LiFAP), lithium oxalatoborate, as well as other lithium bis(chelato)borates having five to seven membered rings, lithium bis(trifluoromethane sulfone imide) (LiTFSI), $LiPF_3(C_2F_5)_3$, $LiPF_3(CF_3)_3$, $LiB(C_2O_4)_2$, LiOTf, $LiC(Tf)_3$, lithium bis-(oxalato)borate (LiBOB), lithium difluoro(oxalato)borate (LiDFOB), lithium-bis (perfluoroethylsulfonyl) imide (LiBETI), lithium difluoro(oxalato)borate (LiDFOB), lithium tetracyanoborate (LiTCB), and mixtures thereof.

In other arrangements, for other electrochemistries, that is for electrochemistries in which a non-lithium metal is the basis of the cell, electrolytes are made by combining the polymers disclosed herein with various kinds of non-lithium salts. For example, non-lithium salts such as salts of aluminum, sodium, potassium, calcium, silver, barium, lead and magnesium can be used with their corresponding metals. Specific examples of such salts include, but are not limited to $AgSO_3CF_3$, NaSCN, $NaSO_3CF_3$, KTFSI, NaTFSI, $Ba(TFSI)_2$, $Pb(TFSI)_2$, and $Ca(TFSI)_2$. Concentration of metal salts in the electrolytes disclosed herein range from 5 to 50 wt %, 5 to 30 wt %, 10 to 20 wt %, or any range subsumed therein.

In one embodiment of the invention, the PPS electrolytes disclosed herein are used as catholytes in lithium battery cells. With reference to FIG. 1, a lithium battery cell 100 has an anode 120 that is configured to absorb and release lithium ions. The anode 120 may be a lithium or lithium alloy foil or it may be made of a material into which lithium ions can be absorbed such as graphite or silicon. The lithium battery cell 100 also has a cathode 140 that includes cathode active material particles 142, an electronically-conductive additive (not shown), a current collector 144, a catholyte 146, and an optional binder (not shown). The catholyte 146 may be any of the PPS polymer electrolytes disclosed here. There is a separator region 160 between the anode 120 and the cathode 140. The separator region 160 contains an electrolyte that facilitates movement of lithium ions (or another metal ions that form the basis of the cell) back and forth between the anode 120 and the cathode 140 as the cell 100 cycles. The separator region 160 may include any electrolyte that is suitable for such use in a lithium battery cell. In one arrangement, the separator region 160 contains a porous plastic material that is soaked with a liquid electrolyte. In another arrangement, the separator region 160 contains a viscous liquid or gel electrolyte. In another arrangement, the separator region 160 contains a solid polymer electrolyte.

A solid polymer electrolyte for use in separator region 160 can be any such electrolyte that is appropriate for use in a Li battery. Of course, many such electrolytes also include electrolyte salt(s) that help to provide ionic conductivity. Examples of such electrolytes include, but are not limited to, block copolymers that contain ionically-conductive blocks and structural blocks that make up ionically-conductive phases and structural phases, respectively. In one arrangement, the ionically-conductive phase contains one or more PPSs, as disclosed herein. The ionically-conductive phase may also contain PPSs in combination, such as in copolymers, with one or more other ionically-conductive polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof.

The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (pxe), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state. Further information about such block copolymer electrolytes can be found in U.S. Pat. No. 9,136,562, issued Sep. 15, 2015, U.S. Pat. No. 8,889,301, issued Nov. 18, 2014, U.S. Pat. No. 8,563,168, issued Oct. 22, 2013, and U.S. Pat. No. 8,268,197, issued Sep. 18, 2012, all of which are included by reference herein.

Figure 2:
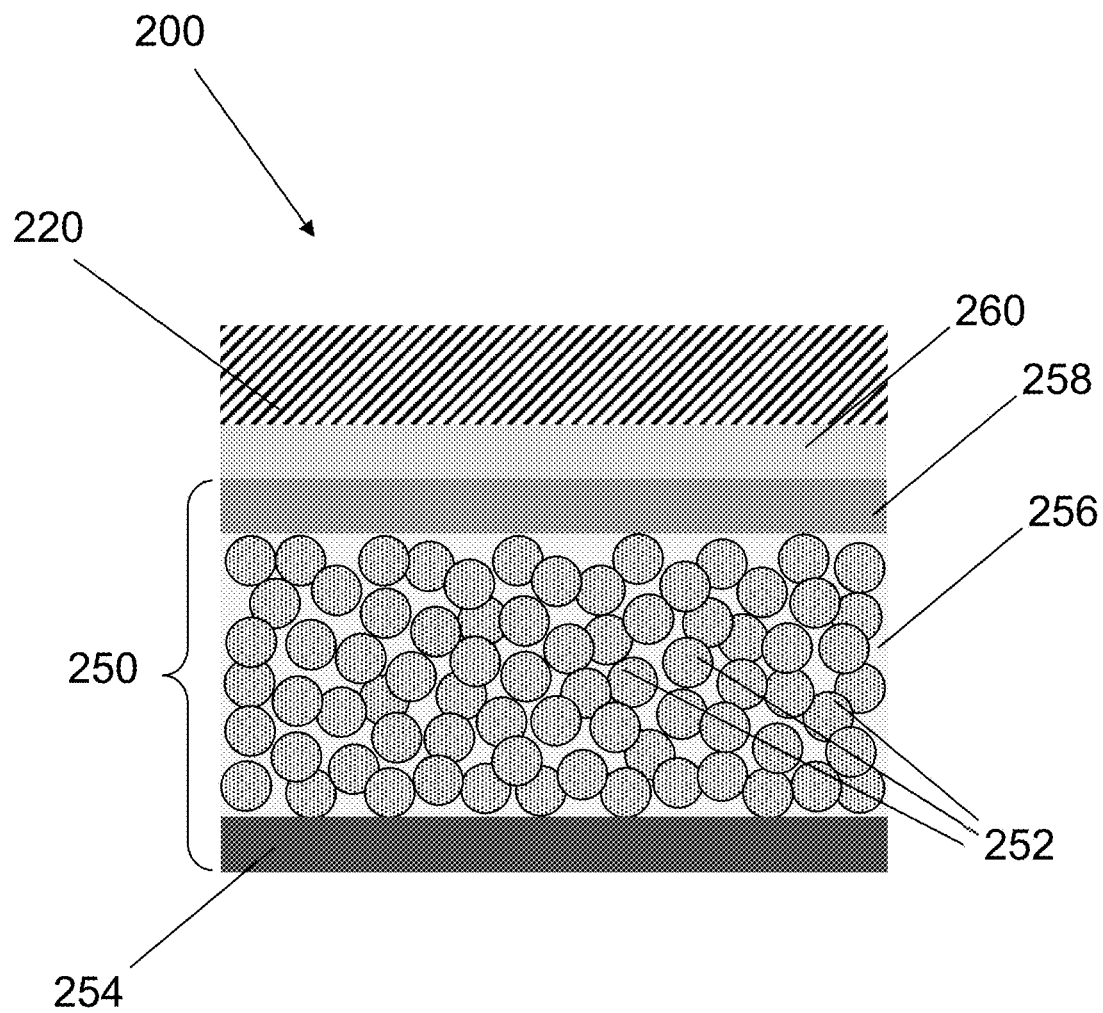
FIG. 2 is a schematic illustration of another configuration of a lithium battery cell that contains a catholyte and a cathode overlayer, according to an embodiment of the invention.

In another embodiment of the invention, a battery cell with a second configuration is described. With reference to FIG. 2, a lithium battery cell 200 has an anode 220 that is configured to absorb and release lithium ions. The anode 220 may be a lithium or lithium alloy foil or it may be made of a material into which lithium ions can be absorbed such as graphite or silicon. The lithium battery cell 200 also has a cathode 250 that includes cathode active material particles 252, an electronically-conductive additive (not shown), a current collector 254, a catholyte 256, an optional binder (not shown), and an overcoat layer 258. Both the electrolyte in the overcoat layer 258 and the catholyte 256 contain any of the PPS polymer electrolytes disclosed here. In one arrangement, the electrolyte in the overcoat layer 258 and the catholyte 256 are the same. In another arrangement, the electrolyte in the overcoat layer 258 and the catholyte 256 are different. There is a separator region 260 between the anode 220 and the cathode 250. The separator region 260 contains an electrolyte that facilitates movement of lithium ions back and forth between the anode 220 and the cathode 250 as the cell 200 cycles. The separator region may include any electrolyte that is suitable for such use in a lithium battery cell, as described above.

Figure 3:
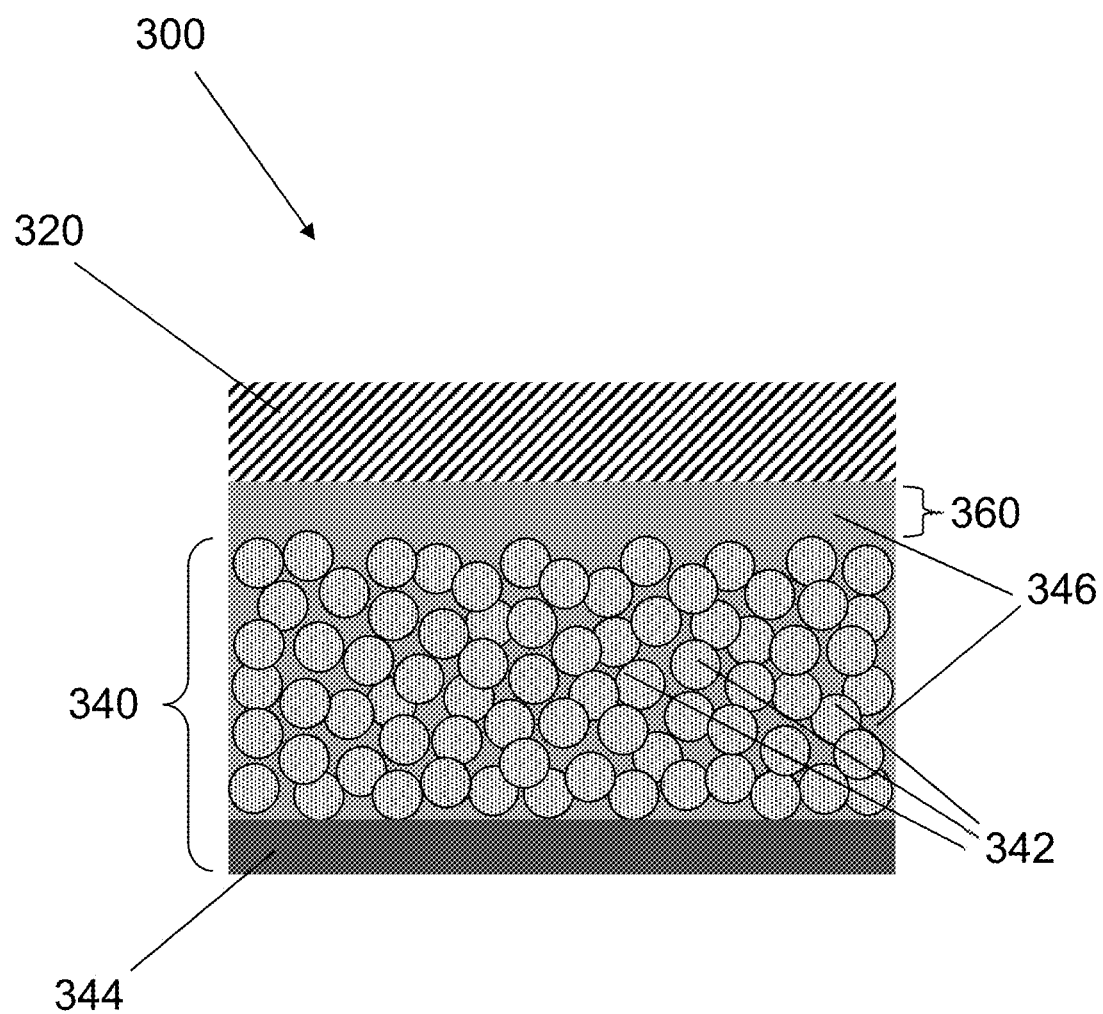
FIG. 3 is a schematic illustration of another configuration of a lithium battery cell that contains a catholyte, according to an embodiment of the invention.

In another embodiment of the invention, a battery cell with a third configuration is described. With reference to FIG. 3, a lithium battery cell 300 has an anode 320 that is configured to absorb and release lithium ions. The anode 320 may be a lithium or lithium alloy foil or it may be made of a material into which lithium ions can be absorbed such as graphite or silicon. The lithium battery cell 300 also has a cathode 340 that includes cathode active material particles 342, an electronically-conductive additive (not shown), a current collector 344, a catholyte 346, and an optional binder (not shown). The catholyte 346 may be any of the PPS polymer electrolytes disclosed here. There is a separator region 360 between the anode 320 and the cathode 340. The catholyte 346 extends into the separator region 360 and facilitates movement of lithium ions back and forth between the anode 320 and the cathode 340 as the cell 300 cycles.

With respect to the embodiments discussed in FIGS. 1, 2, and 3, suitable cathode active materials include, but are not limited to, LFP (lithium iron phosphate), LMP (lithium metal phosphate in which the metal can be Mn, Co, or Ni), NCA, NCM, high energy NCM, lithium manganese spinel, and combinations thereof. The cathode active material particles may be one or more materials selected from the group consisting of lithium iron phosphate, nickel cobalt aluminum oxide, nickel cobalt manganese oxide, lithium manganese phosphate, lithium cobalt phosphate, lithium nickel phosphate, and lithium manganese spinel. Suitable electronically-conductive additives include, but are not limited to, carbon black, graphite, vapor-grown carbon fiber, graphene, carbon nanotubes, and combinations thereof. A binder can be used to hold together the cathode active material particles and the electronically conductive additive. Suitable binders include, but are not limited to, PVDF (polyvinylidene difluoride), PVDF-HFP (poly(vinylidene fluoride-co-hexafluoropropylene), PAN (polyacrylonitrile), PAA (polyacrylic acid), PEO (polyethylene oxide), CMC (carboxymethyl cellulose), and SBR (styrene-butadiene rubber).

Example

The following example provides details relating to synthesis of PPSH electrolytes in accordance with the present invention. It should be understood the following is representative only, and that the invention is not limited by the detail set forth in this example.

Poly(cyanopropyl)methylsiloxane was synthesized according to the following scheme:

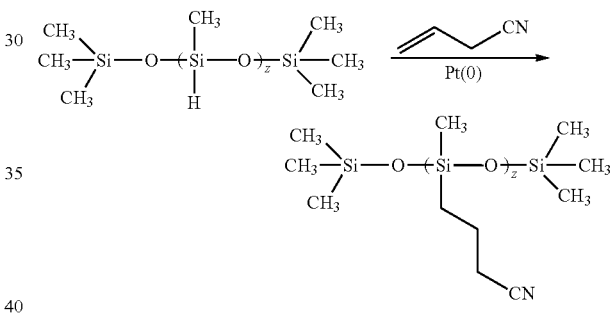

A solution of polymethylhydrosiloxane (2.2 g, 37.2 mmol), allyl cyanide (10.0 g, 148.8 mmol) in dry toluene (12 mL) was prepared and maintained at 0° C. To the solution was added 0.5 mL of 2% platinum(0)-1,3-divinyl-1,1,3,3-tetramethyldisiloxane catalyst complex (in xylene). The solution was gradually heated to 120° C., and the progress of the reaction was monitored using IR spectroscopy (from the disappearance of Si—H stretching frequency at 1270 cm$^{-1}$). Additional platinum catalyst (0.2 mL) was added to the reaction mixture every 12 hours until the reaction was complete. After completion of the reaction, the solution was passed through a plug of celite, and excess allylcyanide and toluene were removed by vacuum distillation. The polymer was dissolved in dichloromethane to make a concentrated solution, which was then added to vigorously stirring 2-propanol to precipitate the polymer. The polymer was then obtained by carefully decanting 2-propanol. The polymer was dried overnight in high vacuum at 50° C.

This invention has been described herein in considerable detail to provide those skilled in the art with information relevant to apply the novel principles and to construct and use such specialized components. However, it is to be understood that the invention can be carried out by different equipment, materials and devices, and that various modifications can be accomplished without departing from the scope of the invention itself

We claim:
1. A polymer composition, comprising:
a polymer selected from the group consisting of a homo polymer with the structure:

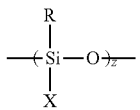

and a copolymer with the structure:

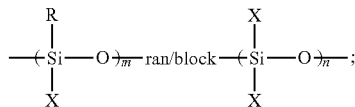

wherein each X is selected independently from the group consisting of cyanomethyl ester, pyrrolidone, cyclic carbamate, phosphonate, and phosphate groups;
each R is selected independently from the group consisting of vinyl, allyl, propargyl, norbornene, cyclopentadienyl, nitroxide, bromo-isobutry bromide, 2,2,6,6-tetramethyl-1-piperidinyloxy, n-tertpbutyl-n-(2-methyl-1-phenylpropyl)-O-(1-phenylethyl)hudroxylamine), hydride, azido propyl, mercaptopropyl, benzophenone, aminopropyl, phenyl, benzyl, napthalene, anthracene, styrene, and acylate groups; and substituted moieties of phenyl, benzyl, napthalene, anthracene, styrene, acylate, and norbornene, groups in which the substituting species are methyl, ethyl, propyl, n-butyl or t-butyl groups;
z is an integer that ranges from 2 to 1000; and
m and n are integers, and the sum of m and n ranges from 2 to 1000.
2. The polymer composition of claim 1 wherein the polymer is a copolymer and each X is selected independently from the group consisting of cyanomethyl ester, pyrrolidone, cyclic carbamate, phosphonate, and phosphate groups.
3. The polymer composition of claim 1 further comprising an electrolyte salt, and wherein the polymer is an electrolyte.
4. The polymer composition of claim 3 wherein the electrolyte salt is a lithium salt.
5. A polymer composition, comprising:
a polymer selected from the group consisting of a homopolymer with the structure:

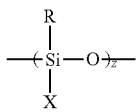

and a copolymer with the structure:

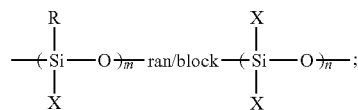

wherein each X is selected independently from the group consisting of cyclic carbamate and phosphonate groups;
each R is selected independently from the group consisting of vinyl and allyl, groups;
z is an integer that ranges from 2 to 1000; and
m and n are integers, and the sum of m and n ranges from 2 to 1000.
6. The polymer composition of claim 5 further comprising an electrolyte salt, and wherein the polymer is an electrolyte.
7. An electrochemical cell, comprising:
an anode configured to absorb and release lithium ions;
a cathode comprising cathode active material particles, an electronically-conductive additive, a catholyte, and an optional binder material;
a current collector adjacent to an outside surface of the cathode; and
a separator region between the anode and the cathode, the separator region comprising a separator electrolyte configured to facilitate movement of lithium ions back and forth between the anode and the cathode;
wherein at least one of the separator electrolyte and the catholyte comprises the electrolyte of claim 4.
8. The electrochemical cell of claim 7 where the separator electrolyte and the catholyte are the same.
9. The electrochemical cell of claim 7 further comprising an overlayer between the cathode and the separator region, the overlayer comprising an overlayer electrolyte, the overlayer electrolyte comprising the electrolyte of claim 4.
10. The electrochemical cell of claim 9 wherein the overlayer electrolyte and the catholyte are the same.
11. The electrochemical cell of claim 7 wherein the anode comprises a material selected from the group consisting of lithium metal, lithium alloy, graphite and silicon.
12. The electrochemical cell of claim 7 wherein the cathode active material particles comprise one or more materials selected from the group consisting of lithium iron phosphate, nickel cobalt aluminum oxide, nickel cobalt manganese oxide, lithium manganese phosphate, lithium cobalt phosphate, lithium nickel phosphate, and lithium manganese spinel.
13. The electrochemical cell of claim 7 wherein the binder material is selected from the group consisting of polyvinylidene difluoride, poly(vinylidene fluoride-co-hexafluoropropylene, polyacrylonitrile, polyacrylic acid, polyethylene oxide, carboxymethyl cellulose, styrene-butadiene rubber, and combinations thereof.

* * * * *